US012639678B2

(12) United States Patent
Scholl et al.

(10) Patent No.: US 12,639,678 B2
(45) Date of Patent: May 26, 2026

(54) METHOD OF PROCESSING DIGITAL CHECKS

(71) Applicant: MASTERCARD INTERNATIONAL INCORPORATED, Purchase, NY (US)

(72) Inventors: Christopher T. Scholl, Manchester, MO (US); David Vorhies, Saint Ann, MO (US); Shawn Mehrhoff, Saint Ann, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/602,512

(22) Filed: Mar. 12, 2024

(65) Prior Publication Data

US 2025/0292219 A1     Sep. 18, 2025

(51) Int. Cl.
| | |
|---|---|
| *G06Q 40/02* | (2023.01) |
| *G06Q 20/04* | (2012.01) |
| *G06Q 20/40* | (2012.01) |

(52) U.S. Cl.
CPC ... *G06Q 20/0425* (2013.01); *G06Q 20/40145* (2013.01); *G06Q 40/02* (2013.01)

(58) Field of Classification Search
CPC ............................................... G06Q 20/0425
USPC ...................................................... 705/35, 39
See application file for complete search history.

(56) References Cited

U.S. PATENT DOCUMENTS

| | | | |
|---|---|---|---|
| 2005/0097046 A1* | 5/2005 | Singfield | G06Q 20/1085 705/42 |
| 2005/0131834 A1* | 6/2005 | Rodriguez | G06Q 20/04 705/64 |
| 2007/0262135 A1* | 11/2007 | Hammell | G06Q 20/40 235/379 |
| 2013/0054461 A1* | 2/2013 | Gupta | G06Q 20/0425 705/44 |
| 2014/0067661 A1* | 3/2014 | Elischer | G06Q 20/042 705/39 |
| 2014/0297517 A1* | 10/2014 | Gnanasekaran | G06Q 20/227 705/39 |

FOREIGN PATENT DOCUMENTS

| | | | |
|---|---|---|---|
| WO | WO-2018233584 A1 * | 12/2018 | G06Q 20/10 |

* cited by examiner

*Primary Examiner* — William E Rankins
(74) *Attorney, Agent, or Firm* — Grant Attorneys at Law PLLC; Kristin Grant

(57) ABSTRACT

A method of processing digital checks is provided. The payor enters a payee name and the financial amount to be paid into a digital check software application. The digital check is then transmitted to the payee. The payee is able to view parts of the digital check while some parts of the digital check remain encrypted and unobservable by the payee. The payee then transmits the digital check to a financial services provider. The financial services provider decrypts the digital check and may perform analyses on the digital check. The financial services provider then transmits the digital check to the financial institution associated with the payee's bank account. The financial institution settles the digital check using conventional check clearing processes.

17 Claims, 2 Drawing Sheets

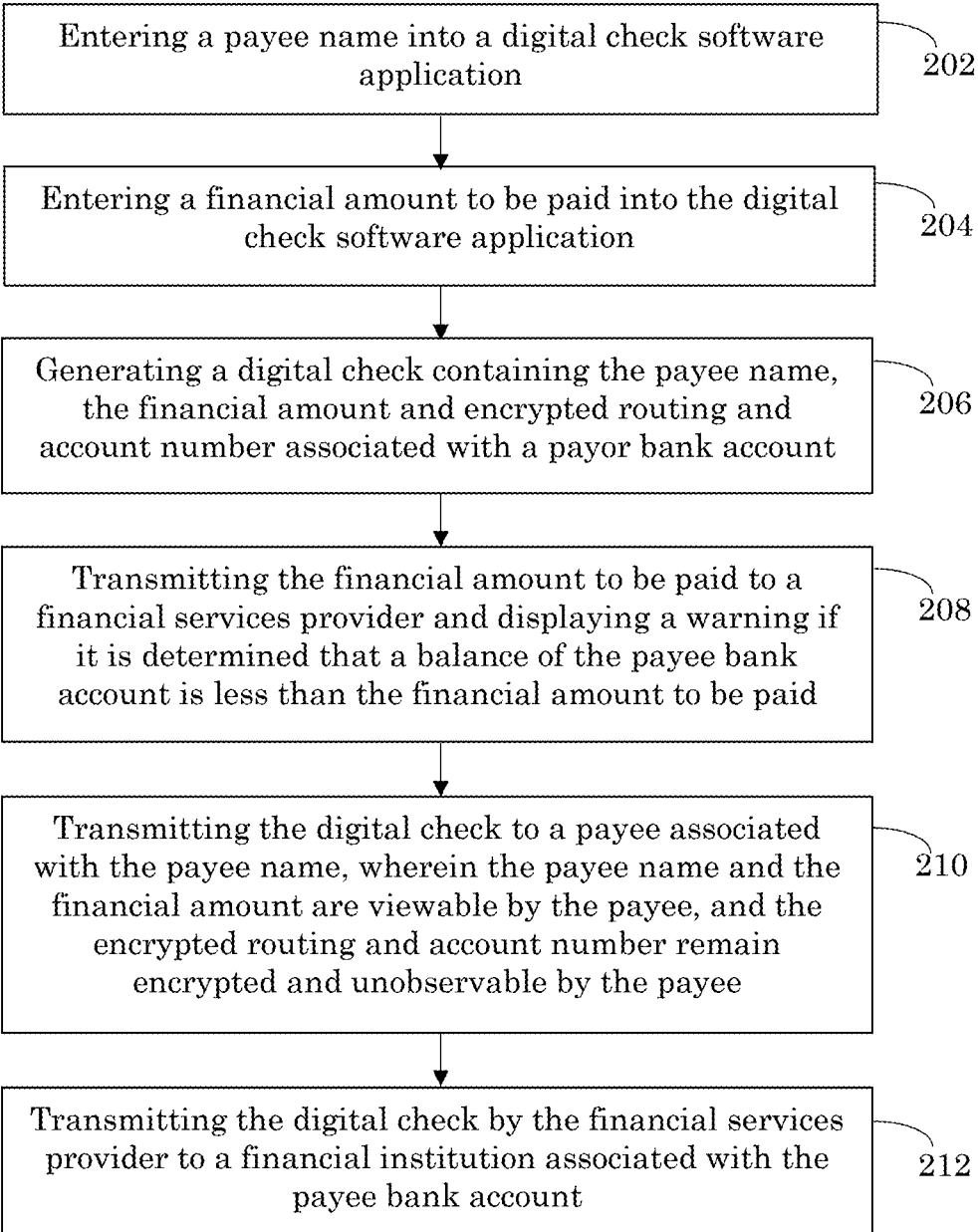

Entering a payee name into a digital check software application — 202

Entering a financial amount to be paid into the digital check software application — 204

Generating a digital check containing the payee name, the financial amount and encrypted routing and account number associated with a payor bank account — 206

Transmitting the financial amount to be paid to a financial services provider and displaying a warning if it is determined that a balance of the payee bank account is less than the financial amount to be paid — 208

Transmitting the digital check to a payee associated with the payee name, wherein the payee name and the financial amount are viewable by the payee, and the encrypted routing and account number remain encrypted and unobservable by the payee — 210

Transmitting the digital check by the financial services provider to a financial institution associated with the payee bank account — 212

*FIG. 2*

METHOD OF PROCESSING DIGITAL CHECKS

BACKGROUND

The present inventions relate generally to financial transaction processing, and more particularly, to methods of processing digital checks.

A variety of methods exist for processing financial transactions between individuals or entities. One method of processing financial transactions involves the use of checks. Although the use of paper checks is widespread, the use of paper checks has declined substantially in response to the increasing use of credit and debit cards. One reason for this change is the convenience and security protocols that are possible with credit and debit cards. However, there are still some advantages of using checks to process financial transactions. For example, checks are typically processed using established banking protocols like ACH (Automated Clearing House) which are often more cost-effective than the processing costs associated with credit and debit cards. Some individuals may also be resistant to using credit or debit cards for financial transactions due to perceived security concerns with such systems. Thus, it is believed that a method of processing digital checks for financial transactions would be desirable.

SUMMARY

A method of processing digital checks is described. In the method, a payor enters information for a payment to a payee in a digital check software application. The digital check software application then generates a digital check with encrypted routing and account numbers for the payor's bank account. The digital check is then transmitted to the payee who is able to view the payee name and financial amount of the check. The digital check is also transmitted to a financial services provider. The financial services provider is able to decrypt the digital check and may perform various analyses of the digital check. The financial services provider then transmits the digital check to the financial institution where the payee's bank account is located. Thereafter, the financial institution may settle the digital check with the payor's bank account using conventional check clearing processes. The invention may also include any other aspect described below in the written description or in the attached drawings and any combinations thereof.

BRIEF DESCRIPTION OF SEVERAL VIEWS OF THE DRAWINGS

The invention may be more fully understood by reading the following description in conjunction with the drawing, in which:

FIG. 2 is a flowchart of a method of processing a digital check.

DETAILED DESCRIPTION

Figure 1:
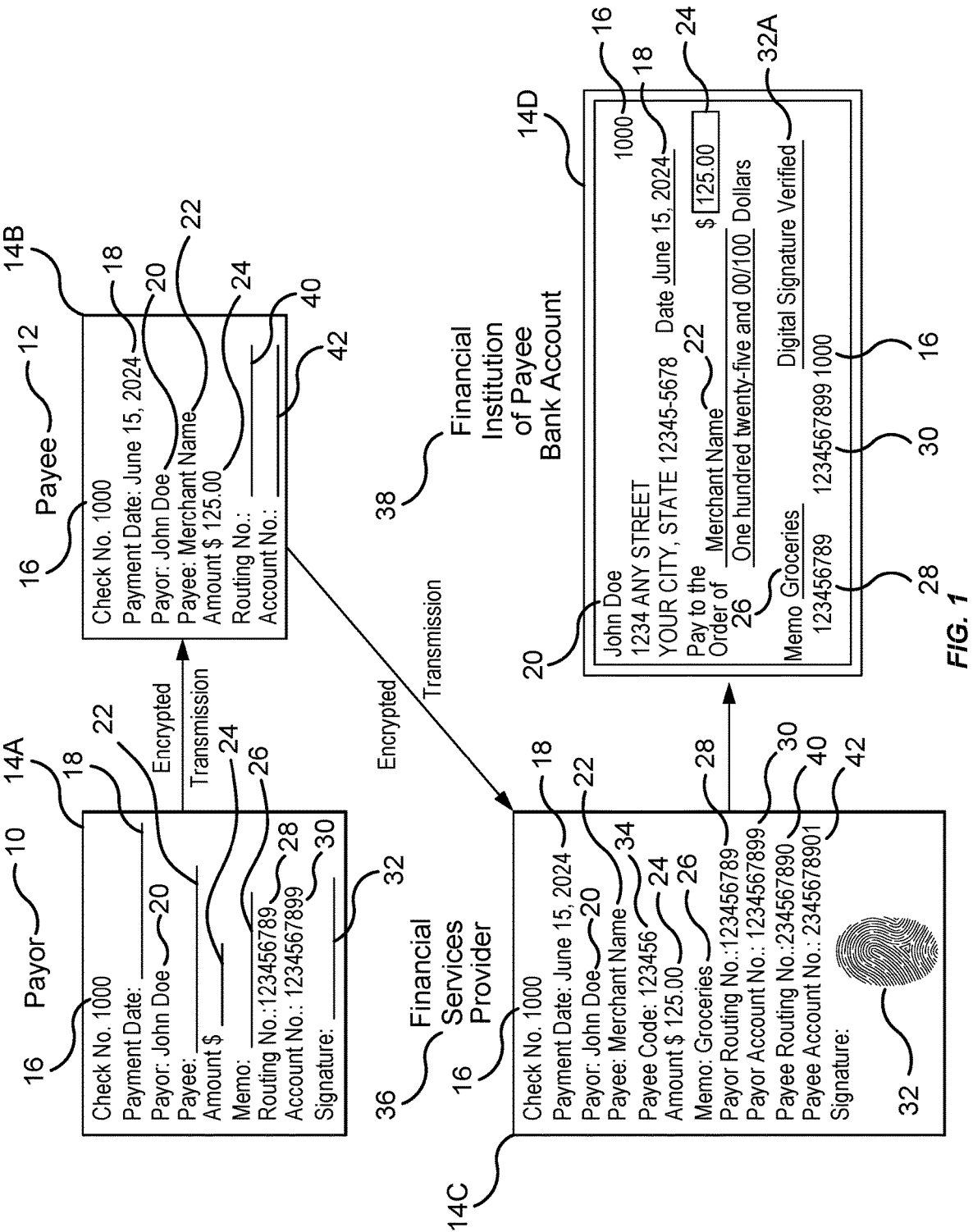
FIG. 1 illustrates a method of processing a digital check.

Referring now to the figures, and particularly FIG. 1, a method of processing digital checks 14 is shown. As shown, a payor 10 initiates the process of a digital check 14A by entering financial transaction information into a digital check software application. Although the digital check software application may be loaded onto a computer device associated with the payee 12 like a POS (point of sale)

device located at a merchant's storefront, it is most preferable for the digital check software application to be loaded onto a computer device associated with the payor 10. For example, the digital check software application may be loaded onto a consumer's mobile phone or home computer. This alternative has the advantage that certain private information unique to the payor 10 (e.g., routing 28 and account 30 numbers) may be set as defaults in the application and may be kept more secure. Thus, for example, the payor 10 may not need to directly enter certain information into the digital check like the check number 16 (since the application can keep track of each check issued using the application), the payor's name 20, and the routing 28 and account 30 numbers for the payor's bank account. However, other information is preferably directly entered by the payor 10 including the payment date 18, the payee's name 22, the financial amount 24 to be paid, any memo notes 26 desired by the payor 10 and the signature 32. In the case of the payee's name 22, it may be preferable for the application to display a list of proposed payees from which the payor 10 may select the desired payee name 22. For example, the application may use geolocation to propose the merchant name of the storefront within which the payor 10 is located as the payee name 22. The application may also display an alphabetized list of proposed payee names that the payor 10 can sort through to select the desired payee name 22. By selecting a payee name 22 from a list of proposed payees, the application may include a payee code 34 associated with the payee name 22 in the digital check 14A. The advantage of this option is described further below.

Once the payor 10 enters all of the required information into the digital check software application, the payor 10 adds a signature 32 and the application generates a digital check 14A. As described, the digital check 14A as completed by the payor 10 may include a check number 16, payment date 18, payor name 20, payee name 22, financial amount 24 to be paid, memo notes 26, routing number 28 and account number 30 for the payor's bank account, and the payor's signature 32. The payor's signature 32 is preferably a biometric trait 32 like a fingerprint 32 but could also be a conventional name signature 32. It is understood that more or fewer items may be included in the digital check 14 as desired.

After the check 14A is complete, the digital check 14A is preferably encrypted for electronic transmission. Although various types of encryption may be used to protect the contents of the digital check 14, it is preferred for the payor's routing 28 and account 30 numbers to be encrypted separately from general transmission encryption protocols since routing 20, 40 and account 30, 42 numbers are particularly sensitive information that should be protected from fraud attempts. Similarly, if a biometric signature 32 and/or a payee code 34 as described above are used, it is preferred for the biometric signature 32 and the payee code 34 to be encrypted separately from general transmission encryption protocols.

The digital check 14A is then transmitted to the payee 12 which is associated with the payee name 22 contained in the digital check 14. Where the payor 10 is a consumer 10 shopping at a merchant's storefront, it may be desirable for the transmission to use NFC (near-field communication) protocol between the consumer's mobile phone and a POS device of the merchant. If desired, the digital check software application may display a notice to the payor 10 that confirms when the payee 12 has received the digital check 14. Although it is desirable for the payee 12 to be able to view parts of the information contained in the digital check 14B, some of the information in the digital check 14 will have limited usefulness to the payee 12, and for security purposes it may be preferred for some of the information to remain encrypted and unobservable by the payee 12. For example, it may be desirable for the payee 12 to be able to view the check number 16, payment date 18, payor name 20, payee name 22 and financial amount 24 to be paid. On the other hand, it may be desirable for the payor's routing 28 and account 30 numbers, memo 26, signature 32 and payee code 34 to remain encrypted and unobservable by the payee 12. Thus, it may be desirable for the check number 16, payment date 18, payor name 20, payee name 22 and financial amount 24 to use a different type of encryption from the payor's routing 28 and account 30 numbers, memo 26, signature 32 and payee code 34. In this way, all of the information in the digital check 14B may be encrypted for transmission, but the payee 12 is able to decrypt and view the check number 16, payment date 18, payor name 20, payee name 22 and financial amount 24. In order for the financial services provider 36 to transmit the digital check 14D to the correct financial institution 38 where the payee 12 desires the check 14 to be deposited, it may be desirable for the payee 12 to enter routing 40 and account 42 numbers associated with the payee's bank account into the digital check 14B. However, it is also possible for the payee 12 to separately provide this information to the financial services provider 36 so that all or a defined category of digital checks 14B received from the payee 12 are transmitted to a predefined financial institution 38.

Once the payee 12 processes the digital check 14B, the digital check 14B is transmitted from the payee 12 to a financial services provider 36. Preferably, the digital check 14B and all information included in the digital check 14B is encrypted during transmission to the financial services provider 36. If the payee's routing 40 and account 42 number are included in the digital check 14B, it is preferable for the payee routing 40 and account 42 numbers to be separately encrypted like the payor routing 28 and account 30 numbers. Unlike the payee 12 who is preferably only allowed to decrypt part of the digital check 14B, the financial services provider 36 is preferably able to decrypt all of the information in the digital check 14C including the check number 16, payment date 18, payor name 20, payee name 22, payee code 34, financial amount 24, memo 26, payor routing number 28, payor account number 30, payee routing number 40, payee account number 42 and payor signature 32. After the financial services provider 36 decrypts the information in the digital check 14C, the financial services provider 36 may perform a variety of security checks. For example, since the payee code 34 is hidden in the digital check 14 from the payor 10 and the payee 12, the financial services provider 36 may compare the payee code 34 with the payee name 22 to determine if they match. However, if the payee code 34 and the payee name 22 do not match, this may mean that an attempted fraud has occurred or some other problem exists with the check 14C, and the financial services provider 36 may reject the digital check 14C. The financial services provider 36 may also compare the biometric trait 32 of the signature 32 with a stored copy of the biometric trade and may reject the digital check 14C if the biometric trait 32 included in the digital check 14C is not match the stored copy of the biometric trait.

It may also be desirable for an expiration date to be assigned to the digital check 14. The expiration date may be entered by the payor 10 and may be an additional item displayed to the payee 12 like the payment date 18 and the financial amount 24. However, it may be more preferable for the expiration date to be automatically set as a default setting by the digital check software application. In this case, it may or may not be displayed to the payee 12. If an expiration date is assigned to the digital check 14, the financial services provider 36 may decrypt the expiration date and compare it to the date when the financial services provider 36 receives the digital check 14C from the payee 12. If the digital check 14C is received after the expiration date, the financial services provider 36 may reject the digital check 14C. It may also be possible for the payor 10 to enter a payment date 18 that is in the future instead of the date when the digital check 14A is transmitted to the payee 12. If the payment date 18 is a future date, the financial services provider 36 may hold the digital check 14C until a future time based on the future date before transmitting the digital check 14D to the financial institution 38 at the future time. The financial services provider 36 may also access a financial database provided by the financial institution 38 to analyze past balances of the payor's bank account. Based on the past balances, if the financial services provider 36 determines that the expected balance of the payor's bank account will be less than the financial amount of the digital check 14 on the future payment date 18, the financial services provider 36 may reject the digital check 14C or may send a warning notice to the payor 10, for example, using the digital check software application loaded onto the payor's computer device. It may also be desirable for the financial services provider 36 to perform a pre-check of the financial amount 24 to be paid before the digital check 14A is transmitted to the payee 12. For example, when the payor 10 enters a financial amount 24 into the digital check software application, the digital check software application may transmit the financial amount 24 to the financial services provider 36 before the digital check 14A is transmitted to the payee 12. The financial services provider 36 may then check the current balance of the payor's bank account, and if the current balance is less than the financial amount 24 entered into the digital check 14A, the digital check software application may display a warning notice to the payor 10 that there are insufficient funds in the payor's bank account to cover the entered financial amount 24. The digital check software application may also prevent transmission of the digital check 14A to the payee 12 if there are insufficient funds in the payor's bank account.

Once the financial services provider 36 completes its analysis of the digital check 14C, the financial services provider 36 transmits the digital check 14B to the financial institution 38 where the payee's bank account is located. If a biometric trait 32 has been used to sign the digital check 14, it may be desirable for the financial services provider 36 to exclude the biometric trait 32 from the digital check 14D transmitted to the financial institution 38 to protect the biometric trait 32 from disclosure. In this case, the financial services provider 36 may enter a label such as "Digital Signature Verified" 32A into the digital check 14D which the financial institution 38 has previously agreed to accept for the signature 32. If the payee 12 has entered the routing 40 and account 42 numbers for its bank account, the financial services provider 36 may use the payee's routing number 42 determine which financial institution 38 to transmit the digital check 14D to. Otherwise, the payee 12 may have previously notified the financial services provider 36 what financial institution 38 the digital check 14D is to be transmitted to. Preferably, the digital check 14D is encrypted for electronic transmission to the financial institution 38 similar to the transmissions between the payor 10 and the payee 12 and between the payee 12 and the financial services provider 36. However, if desired, it is also possible for the digital check 14D to be transmitted in a more conventional manner with the financial services provider 36 printing the digital check 14D and physically transmitting the printed digital check 14D to the financial institution 38. Once the financial institution 38 receives the digital check 14D, the financial transaction is preferably completed using conventional check processing, for example, using the ACH (automated clearing house) network. This simplifies the process of actually transferring the funds from the payor 10 to the payee 12 and minimizes the cost of transferring the funds.

It is understood that the described digital check processing system is intended to operate autonomously on programmed computer systems utilizing computer algorithms such that the system may be implemented by one or more computer processors (e.g., in a server system) executing computer-executable instructions stored on a non-transitory computer-readable storage medium. Thus, for example, in the case of the financial services provider 36 and other steps described herein, it is unnecessary for human beings to make the required data transmissions, determinations, etc. This autonomous design makes the digital check system scalable to a level that would be impractical if human beings were to attempt to perform the steps required by the system. While it is understood that various human beings may provide inputs to the system and may adjust parameters that control how the system operates, the digital check processing system is intended to have the capability of processing many thousands of digital checks in short periods of time (e.g., seconds or less) that would be impossible to accomplish with human intervention in each transaction.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

FIG. 2 is a flowchart of a method 200 of processing a digital check. The method 200 begins at step 202 with entering a payee name into a digital check software application. Next, the method 200 continues at step 204 with entering a financial amount to be paid into the digital check software application. Next, the method 200 continues at step 206 with generating a digital check containing the payee name, the financial amount and encrypted routing and account number associated with a payor bank account. Next, the method 200 continues at step 208 with transmitting the financial amount to be paid to a financial services provider and displaying a warning if it is determined that a balance of the payee bank account is less than the financial amount to be paid. Next, the method 200 continues at step 210 with transmitting the digital check to a payee associated with the payee name, wherein the payee name and the financial amount are viewable by the payee, and the encrypted routing and account number remain encrypted and unobservable by the payee. Next, the method 200 ends at step 212 with transmitting the digital check by the financial services provider to a financial institution associated with the payee bank account.

The invention claimed is:

1. A method of processing a digital check, comprising: entering a payee name into a digital check software application; entering a financial amount to be paid into the digital check software application; generating a digital check containing the payee name, the financial amount and encrypted routing and account numbers associated with a payor bank account; transmitting the digital check to a payee associated with the payee name, wherein the payee name and the financial amount are viewable by the payee, and the encrypted routing and account numbers remain encrypted and unobservable by the payee; transmitting the digital check from the payee to a financial services provider; decrypting the routing and account numbers by the financial services provider; transmitting the digital check by the financial services provider to a financial institution associated with a payee bank account; wherein the digital check software application transmits the financial amount to be paid to the financial services provider before the digital check is transmitted, the financial services provider checking a balance of the payor bank account in response to receiving the financial amount to be paid, and the digital check software application displaying a warning if the balance is less than the financial amount to be paid; and wherein the payee enters routing and account numbers associated with the payee bank account into the digital check.

2. The method of processing a digital check according to claim 1, wherein the payor bank account is associated with a consumer, and the digital check software application is loaded onto a computer device associated with the consumer.

3. The method of processing a digital check according to claim 1, wherein the payee name is entered by selecting the payee from a list of proposed payee's displayed in the digital check software application.

4. The method of processing a digital check according to claim 3, wherein a payee code associated with the payee name is encrypted and included in the digital check, the payee code remaining encrypted and unobservable by the payee, the financial services provider decrypting the payee code and comparing the payee code with the payee name, the digital check being rejected if the payee code does not match the payee name.

5. The method of processing a digital check according to claim 1, wherein a biometric trait of a consumer associated with the payor bank account is encrypted and included in the digital check, the biometric trait remaining encrypted and unobservable by the payee, the financial services provider decrypting the biometric trait and comparing the biometric trait with a stored copy of the biometric trait, the digital check being rejected if the biometric trait does not match the stored copy of the biometric trait.

6. The method of processing a digital check according to claim 1, wherein the financial services provider removes a biometric trait from the digital check and replaces the biometric trait with a label indicating that the biometric trait has been verified, the biometric trait thereby not being transmitted to the financial institution.

7. The method of processing a digital check according to claim 1, wherein a future date for 6 payment is included in the digital check, the financial services provider holding the digital check until a future time based on the future date and transmitting the digital check to the financial institution at the future time.

8. The method of processing a digital check according to claim 1, wherein a future date for payment is included in the digital check, the financial services provider accesses a financial database with past balances of the payor bank account and determines an expected balance of the payor bank account on the future date, the financial services provider transmitting a notice to the digital check software application if the expected balance is less than the financial amount of the digital check.

9. The method of processing a digital check according to claim 1, wherein a future date for payment is included in the digital check, the financial services provider accesses a financial database with past balances of the payor bank account and determines an expected balance of the payor bank account on the future date, the financial services rejecting the digital check if the expected balance is less than the financial amount of the digital check.

10. The method of processing a digital check according to claim 1, wherein a check number is included in the digital check, the check number being viewable by the payee.

11. The method of processing a digital check according to claim 1, wherein the payee name and the financial amount are encrypted in the digital check during transmission to the payee, the encryption of the payee name and the financial amount being different from the encryption of the routing and account numbers, the payee decrypting the payee name and the financial amount for viewing thereof.

12. The method of processing a digital check according to claim 1, wherein the payee name and the financial amount are encrypted in the digital check during transmission to the financial services provider, the financial services provider decrypting the payee name and the financial amount.

13. The method of processing a digital check according to claim 1, wherein the digital check software application displays a notice confirming when the payee has received the digital check.

14. The method of processing a digital check according to claim 1, wherein the digital check is transmitted to the payee using a near-field communication (NFC) protocol.

15. The method of processing a digital check according to claim 1, wherein the digital check contains an expiration date, the financial services provider rejecting the digital check if the digital check is transmitted to the financial services provider after the expiration date.

16. The method of processing a digital check according to claim 1, wherein the routing and account numbers associated with the payee bank account are encrypted during transmission to the financial services provider.

17. The method of processing a digital check according to claim 1, wherein the routing number associated with the payee bank account is decrypted by the financial services provider, the digital check being transmitted to the financial institution associated with the payee bank account using the routing number associated with the payee bank account.

* * * * *